United States Patent [19]
Stormon et al.

[11] Patent Number: 5,860,085
[45] Date of Patent: Jan. 12, 1999

[54] INSTRUCTION SET FOR A CONTENT ADDRESSABLE MEMORY ARRAY WITH READ/WRITE CIRCUITS AND AN INTERFACE REGISTER LOGIC BLOCK

[75] Inventors: Charles D. Stormon; Edward Saleh; Nikos B. Troullinos, all of Syracuse, N.Y.; Raymond M. Leong, Los Altos, Calif.

[73] Assignee: Cypress Semiconductor Corporation, San Jose, Calif.

[21] Appl. No.: 284,372

[22] Filed: Aug. 1, 1994

(Under 37 CFR 1.47)

[51] Int. Cl.⁶ .................................................. G06F 12/00
[52] U.S. Cl. ............................. 711/108; 711/128; 711/3; 365/49; 395/376
[58] Field of Search ..................................... 395/435, 455, 395/375, 376; 365/49; 711/108, 128, 3

[56] References Cited

U.S. PATENT DOCUMENTS

| | | | |
|---|---|---|---|
| 3,771,139 | 11/1973 | Digby | 711/108 |
| 3,806,890 | 4/1974 | Smith | 711/108 |
| 3,949,368 | 4/1976 | West | 711/158 |
| 4,152,762 | 5/1979 | Bird et al. | 711/108 |
| 4,559,618 | 12/1985 | Houseman et al. | 365/49 |
| 4,805,093 | 2/1989 | Ward | 711/108 |
| 4,888,731 | 12/1989 | Chuang et al. | 365/49 |
| 4,890,260 | 12/1989 | Chuang et al. | 365/49 |
| 4,928,260 | 5/1990 | Chuang et al. | 365/49 |

(List continued on next page.)

OTHER PUBLICATIONS

M. Morris Mano, Computer System Architecture, Prentice–Hall, 1976, pp 453–459.

Charles D. Stormon et al., A General–Purpose CMOS Associative Processor IC and System, IEEE Micro, Dec. 1992, vol. 6, Issue 6, pp 68–78.

Charles Stormon, The Coherent Processor an Associative Processor Architecture and Application, Compron, IEEE Computer Society International Conference, 1991, pp 270–275.

(List continued on next page.)

*Primary Examiner*—Eddie P. Chan
*Assistant Examiner*—Hong C. Kim
*Attorney, Agent, or Firm*—Blakely, Sokoloff, Taylor & Zafman LLP

[57] ABSTRACT

An associative processing memory system for concurrent data searching and concurrent data processing which includes content addressable memory (CAM) array having multiple CAM words; a multiplexer for executing one of the input devices and for passing an output of one of the input devices; an interface register logic block for storing instructions in a command register and control and status information in a control and status register; a match circuit for executing a match instruction for performing a masked comparison of data in every CAM word in the CAM array to a search pattern; a read circuit for executing a read instruction for reading one CAM word in the CAM array wherein the CAM word is selected using a response register A and a multiple response resolver (MRR); a write circuit for executing a write instruction for performing a masked write operation to every CAM word indicated by a bit set in a select vector; a shift circuit for executing a shift instruction for shifting the response register A up or down by one bit position; a clear circuit for executing an instruction for clearing the most significant bit set in the response register A; a move circuit for executing a move instruction for writing the data contents indicated by the select vector to a response register; a write-column circuit for executing an instruction for writing the contents of the select vector to a column in the CAM array; a circuit for executing an nop instruction for performing no operation; a read-shift for executing a readshift instruction; a read-snext circuit for executing a readsnext instruction; a write-shift circuit for executing a writeshift instruction; and a write-snext circuit for executing a writesnext instruction.

31 Claims, 14 Drawing Sheets

U.S. PATENT DOCUMENTS

| | | | |
|---|---|---|---|
| 4,959,811 | 9/1990 | Szczepanek | 365/49 |
| 4,989,140 | 1/1991 | Nishimukai et al. | 711/207 |
| 5,359,720 | 10/1994 | Tamura et al. | 711/108 |
| 5,440,709 | 8/1995 | Edgar | 711/1 |
| 5,442,762 | 8/1995 | Kato et al. | 395/384 |
| 5,502,832 | 3/1996 | Ali-Yahia et al. | 711/108 |

OTHER PUBLICATIONS

J. Ribeiro, Content–Addressable Memories Applied to Execution Logic Programs, IEE Proceedings, Part E: Computers & Digital Techniques, Sep. 1989, vol. 136, Issue 5, pp. 383–388.

*Associative Processing Products*, Coherent Research, Inc., (entire document—28 pages), 1993.

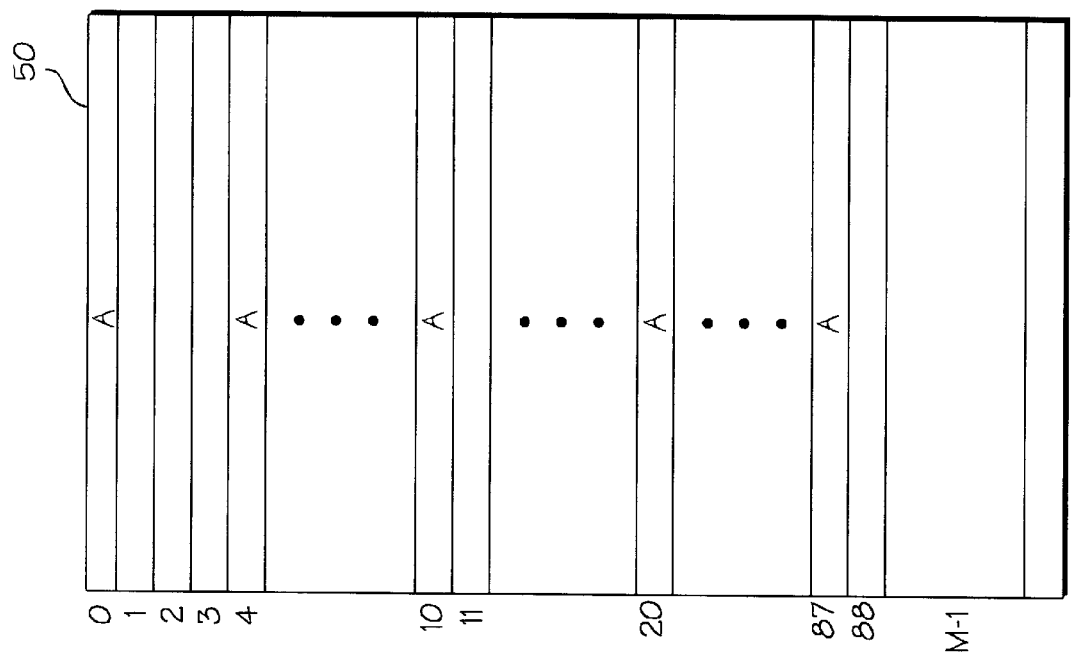
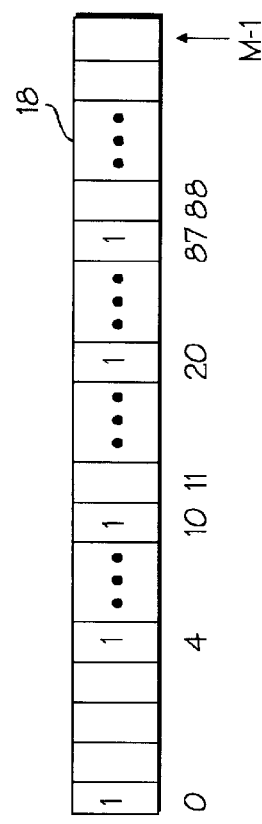

|  | bit N-1 | bit 31 | bit 0 |
|---|---|---|---|
| ROW 0 |  | 1 |  |
| ROW 1 |  | 0 |  |
| ROW 2 |  | 0 |  |
| ROW 3 |  | 1 |  |
| ⋮ | ⋮ | ⋮ | ⋮ |
| ROW 121 |  | 1 |  |
| ROW 122 |  | 0 |  |
| ⋮ | ⋮ | ⋮ | ⋮ |
|  |  |  |  |
|  |  | 0 |  |
|  |  | 1 |  |
| ROW M-1 |  | 0 |  |

Fig. 7c

| OPCODE | RESPREG | SELVECT | DATASRC | RESV | MSKSRC | DIR | GPLBTERMS | MPAT | MPATBIT | RESV | BITPOS |
|---|---|---|---|---|---|---|---|---|---|---|---|

Fig. 8

| Opcode | Instruction |
|---|---|
| 00000 | NOP |
| 00001 | SHIFT |
| 00010 | SNEXT |
| 00011 | MOVE |
| 00100 | READ |
| 00101 | READSHIFT |
| 00110 | READSNEXT |
| 01000 | WRITE |
| 01001 | WRITESHIFT |
| 01010 | WRITESNEXT |
| 01011 | WRITECOL |
| 01100 | MATCH |

Fig. 9

| Instruction Set | Operation |
|---|---|
| NOP | No operation |
| SHIFT, SNEXT | Manipulate response register A |
| MOVE | Write to a response register |
| READ, READSHIFT, READSNEXT | Read CAM |
| WRITE, WRITESHIFT, WRITESNEXT | Write to CAM |
| WRITECOL | Write column |
| MATCH | Perform masked comparison |

Fig. 10

INSTRUCTION SET FOR A CONTENT ADDRESSABLE MEMORY ARRAY WITH READ/WRITE CIRCUITS AND AN INTERFACE REGISTER LOGIC BLOCK

BACKGROUND OF THE INVENTION

A) Related Applications

This application is related to an application of Charles D. Stormon, Abhijeet Chavan, Nikos B. Troullinos and Raymond M. Leong which is filed concurrently herewith, Ser. No. 08/284/347, filed Aug. 1, 1994, and which is entitled "A Content Addressable Memory Array Integrated with a General Logic Block".

B) Field of the Invention

The present invention relates to the field of data processing incorporating a content addressable memory, associative storage, parallel-search storage or the like wherein high performance of data searching, processing of stored data or processing of search results is required.

C) Art Background

In a conventional computer, processing of the contents of a memory is carried out in a single instruction single data (SISD) fashion. A single word in a memory is selected for access by an address that uniquely identifies that word. Instruction sets for the prior art have been based on selecting single operands by unique addresses with no provision for accessing multiple stored words for concurrent operations.

Content addressable memories (CAMS) are used generally in associative memory processing and specifically in computer data processing wherein it is desirable to identify the location of the data stored in the memory by specifying part or all of its contents. However, CAMs have not been popular because of high manufacturing cost and low performance of data searching and data processing.

The present invention significantly increases the performance of applications that include searching stored data and/or processing the stored data or search results. This class of problems is typically handled in prior art by software algorithms that search and process data in a serial (or a SISD) fashion. CAM array 10 in FIG. 1 of the present invention supports a concurrent search that compares all of the stored CAM words to the input data in one operation, thus implemented as a single instruction multiple data (SIMD) operation. The data stored in CAM array 10 can also be processed in an SIMD fashion in accordance with the present invention. Furthermore, the present invention supports more complex operations such as finding inexact (fuzzy) matches for data that falls into a specified range.

SUMMARY OF THE INVENTION

The present invention provides an associative processing memory system which is capable of executing a plurality of operations specified by a plurality of instructions utilized in the associative processing memory system for concurrent data searching and concurrent data processing including a content addressable memory (CAM) array having a plurality of storage locations for storing data comprising CAM words. The present invention significantly increases the performance of applications that include searching stored data and/or processing the stored data or search results. Furthermore, the present invention supports more complex operations such as finding inexact (fuzzy) matches for data that falls into a specified range.

The instructions include the following instructions and their associated operations: (1) a match instruction for performing a masked comparison of data in every CAM word in said CAM array with a search pattern; (2) a read instruction for reading one CAM word in said CAM array wherein said CAM word is selected using a response register A and a multiple response resolver (MRR); (3) a write instruction for performing a masked write operation to every CAM word indicated by a bit set in a select vector; (4) a shift instruction for shifting said response register A up or down by one bit position; (5) an instruction (referred to as "snext") for clearing the most significant bit set in said response register A; (6) a move instruction for writing the contents of said select vector to a register selected from a group including said response register A, a response register B and a response register C; (7) an instruction (referred to as "writecol") for writing the contents of said select vector to a column in said CAM array; (8) an instruction (referred to as "nop") for performing no operation; (9) an instruction (referred to as "readshift") for combining said read instruction and said shift instruction wherein during said readshift instruction, said response register A is shifted either up or down by one bit after said read instruction is executed; (10) an instruction (referred to as "readsnext") for combining said read instruction and said snext instruction wherein during said readshift instruction, said read instruction is performed first, and then the most significant bit set in said response register A is cleared; (11) an instruction (referred to as "writeshift") for combining said write instruction and said shift instruction wherein said response register A is shifted up or down by one bit after a write operation; (12) an instruction (referred to as "writesnext") for combining said write instruction with said snext instruction wherein said write instruction is performed first, and then the most significant bit set in said response register A is cleared.

In addition, the associative processing memory system for concurrent data searching and concurrent data processing supports an instruction format including the following fields: (1) a field (referred to as the "opcode" field) for containing binary codes for one of the instructions used for said associative processing memory system; (2) a field (referred to as the "respreg" field) for selecting one of response registers; (3) a field (referred to as the "selvect" field) for specifying one of input devices to be selected, said input devices having a match latch, a multiple response resolver (MRR), a general purpose logic block (GPLB) and a unit for supplying a reference value (referred to as a "supply one unit"); (4) a field (referred to as the "datasrc" field) for specifying the source of a data pattern to be selected by a data-source logic unit; (5) a field (referred to as the "msksrc" field) for specifying the source of a mask pattern to be selected by a mask-source logic unit; (6) a field (referred to as the "dir" field) for specifying the direction of a shift instruction; (7) a field (referred to as the "gplbterms" field) for specifying one logic operation to be performed by said GPLB on the contents of any one or more of said response registers; (8) a field (referred to as the "mpat" field) for selecting either of an internally generated fill pattern and an internally generated mark pattern; (9) a field (referred to as the "mpatbit" field) for specifying fill bits in said fill pattern or a mark bit in said mark pattern; and (10) a field (referred to as the "bitpos" field) for specifying the locations of said fill bits or a location of said mark bit.

BRIEF DESCRIPTION OF THE DRAWINGS

FIG. 6a is a select vector wherein the bit positions 0, 4, 10, 20 and 87 are set to logic 1.

FIG. 6b is a CAM array wherein the CAM words at positions 0, 4, 10, 20, and 87 are written with the data "A".

FIG. 7b is a select vector whose contents are to be written to a column of the CAM array in FIG. 7a.

FIG. 7c is the selected column in FIG. 7a to which the contents of the select vector in FIG. 7b are written.

FIG. 8 is an instruction format that may be used in the present invention.

FIG. 9 presents a set of opcodes and instructions may be used in the present invention.

FIG. 10 presents an example of an instruction set for the CAM system in FIG. 1.

DETAILED DESCRIPTION OF THE INVENTION

The present invention provides a content addressable memory (CAM) array integrated with a single instruction multiple data (SIMD) general register logic block, an SIMD interface register logic block and a general control block.

A) SYSTEM CONFIGURATION/ORGANIZATION

Figure 1:
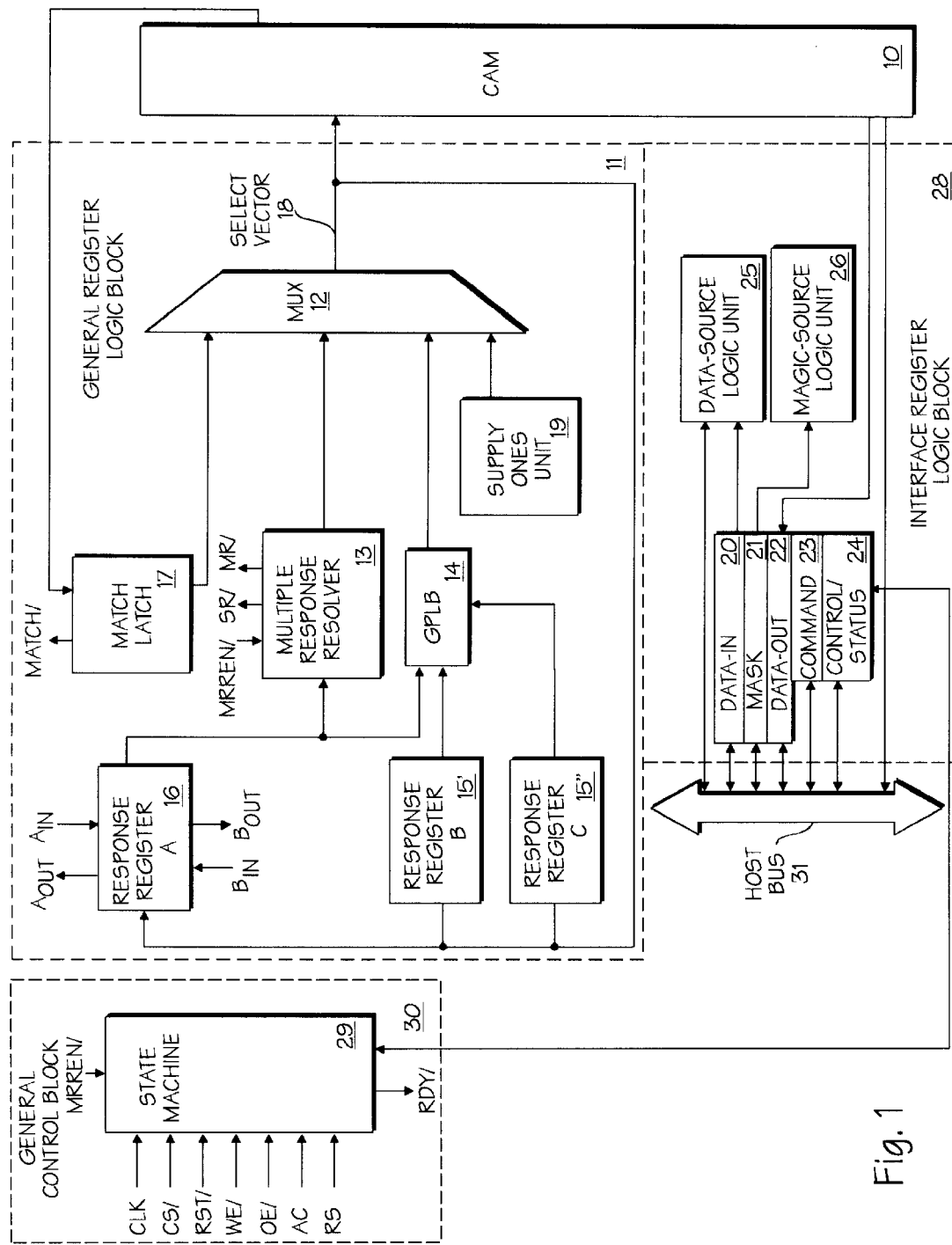
FIG. 1 presents a block diagram of a content addressable memory (CAM) system according to the present invention wherein a CAM array is integrated with a single instruction multiple data (SIMD) general register logic block, an SIMD interface register logic block and a general control block.

FIG. 1 presents a block diagram of a CAM system in accordance with the present invention. In the preferred embodiment of the invention, the CAM system includes an array of content addressable memories (CAMs) 10, a general register logic block 11, an interface register logic block 28 and a general control block 30. The notation "/" in FIG. 1 means that a signal with the notation "/" is inverted, meaning that a signal is active when the signal is low. For example, the signal SR/ of multiple response register 13 is active when the signal is low. It should be noted that although some of the signals are inverted in the preferred embodiment of the present invention, each signal can be either inverted or non-inverted.

1) A CAM ARRAY

Figure 2:
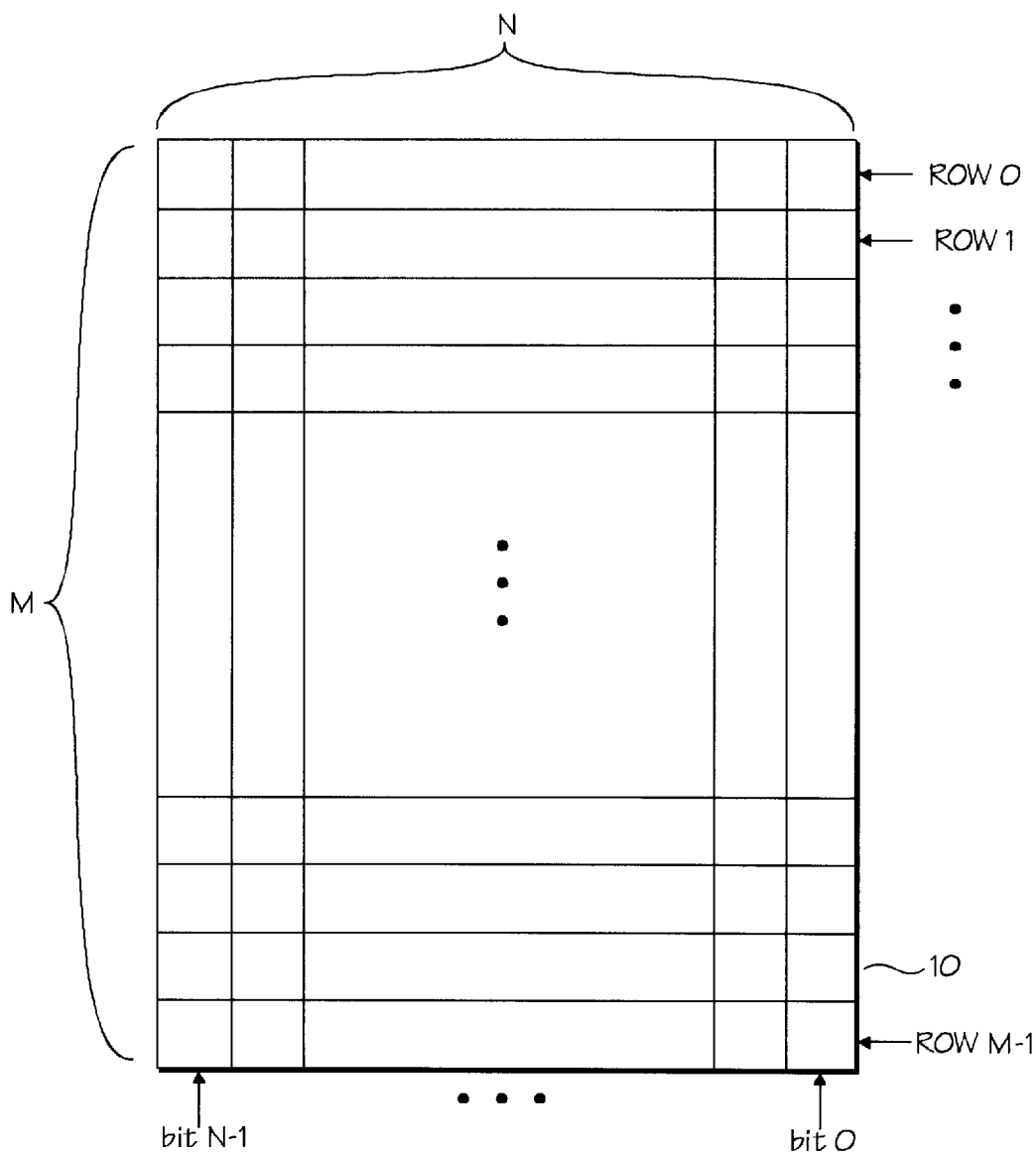
FIG. 2 is a CAM array with M CAM words wherein each CAM word is N-bit long.

A CAM array 10 typically consists of a plurality of CAM words, such as M CAM words each having N bits, as shown in FIG. 2. M and N can be any positive integers. A CAM word can be of any length. For example, a CAM word can be 1-bit long, 30-bit long, 42-bit long, 64-bit long, 120-bit long, or 256-bit long, etc. Data patterns can be written or searched on CAM array 10. As will be discussed, the depth of a CAM array can be increased by cascading multiple CAM systems to increase the number of CAM words. In addition, if a data pattern is longer than the length of a CAM word, multiple adjacent CAM words can be linked to form a multi-word storage unit.

2) INTERFACE REGISTER LOGIC BLOCK

Continuing to refer to FIG. 1, interface register logic block 28 has, in the preferred embodiment of the invention, a data-in register 20, a mask register 21, a data-out register 22, a command register 23, a control/status register 24, a data-source logic unit 25 and a mask-source logic unit 26. Interface register logic block 28 provides a means for interfacing CAM array 10 to a host bus 31 for instructions and data transfers as well as generation of mask patterns. Masking is a logical technique in which certain bits of a word are blanked out or inhibited. In the preferred embodiment of the present invention, data-in register 20, mask register 21 and data-out register 22 contain 42 bits in each register, and command register 23 and control/status register 24 contain 32 bits in each register. However, it should be noted that a register can be of any length.

Host bus 31 couples various external logic devices (not shown) including, but not limited to, a keyboard, a mouse, a monitor, a printer and a central processing unit to data-source logic unit 25, data-in register 20, mask register 21, data-out register 22, command register 23 and control/status register 24. Host bus 31 can hold an input data pattern, an output data pattern, a mask pattern or an instruction. There are many ways to drive host bus 31. The CAM system outputs data to host bus 31 when the following conditions exist: (1) an output enable (OE/) signal in general control block 30 is asserted, (2) a chip select (CS/) signal is asserted, (3) a write (WE/) indicator is deasserted, and (4) a register bank read access or a valid READ, READSHIFT or READSNEXT instruction is being executed. A host device including, but not limited to, a CPU, a state machine or other external logic such as a controller will drive host bus 31 to write a data pattern into a CAM register or to data-source logic unit 25, to write an instruction to be executed by the CAM system, or to receive data from the CAM system.

Data-in register 20 receives and stores a data pattern to be written to or to be searched on CAM array 10 from host bus 31. Mask register 21 accepts a mask pattern to be used to mask out certain bits in the data pattern. Data-source logic unit 25 is a multiplexer that can select a data pattern from data-in register 20 or from host bus 31. After selecting a data pattern, data-source logic unit 25 transmits the data pattern to CAM array 10. Data-source logic unit 25 can also provide all 1's or all 0's to CAM array 10 so that every bit of the CAM words in CAM array 10 will be set to either 1 or 0. Mask-source logic unit 26 selects a mask pattern either from mask register 21 or from an internally generated mask pattern according to the instruction stored in command register 23, and transmits the selected mask pattern to CAM array 10. Data-source logic unit 25 and mask-source logic unit 26 together produce and transmit to CAM array 10 a masked data pattern for masked comparisons or masked write operations.

Data-out register 22 latches the last data word read from CAM array 10. A data word can also be read directly from CAM array 10 when CAM array 10 transmits a data word directly to host bus 31. Command register 23 contains an instruction that can be executed by the CAM system. Control/status register 24 can hold various control and status information. For instance, control/status register 24 may include the status information regarding whether a match has occurred after a match operation. If a match is found, control/status register 24 can also indicate the identification number of the CAM array in a cascaded CAM system chain where the match is found and the location of the particular CAM word found in the CAM array.

Interface register logic block 28 provides two-way communications between host bus 31 and a group of registers including Data-in register 20, mask register 21, data-out register 22, command register 23 and control/status register 24 so that not only data can be written to or read from a register but also the contents of each register can be validated by host software, if needed. Interface register logic block 28 also provides one-way communications from host bus 31 to data-source logic unit 25 and from CAM array 10 to host bus 31. Interface register logic block 28 accommodates any differences between the width of host bus 31 and the length of a CAM word. In addition, the width of an internal bus in interface register logic block 28 may be different from the width of host bus 31 or the length of a CAM word.

3) GENERAL REGISTER LOGIC BLOCK

General register logic block 11 in FIG. 1 has, in the preferred embodiment of the invention, a match latch (ML) 17, a multiple response resolver (MRR) 13, a general purpose logic block (GPLB) 14, a supply ones (or an alternative reference value) unit 19, a multiplexer 12 and three response registers—response register A 16, response register B 15' and response register C 15". General register logic block 11 provides a means for reading CAM array 10, and a means for writing to CAM array 10 in parallel (or in a SIMD fashion), and a means for performing logic operations on the contents of the three response registers. In one embodiment, general register logic block 11 includes at least one response register. In another embodiment, general register logic block 11 includes more than three response registers. In yet another embodiment, there are no response registers per se—only a match latch and the ability to produce a select vector according to the contents of the match latch or its inverted contents.

Referring to FIG. 1, match latch 17 is coupled to CAM array 10 and multiplexer 12. Match latch 17 contains at least as many bits as the number of CAM words in CAM array 10. Match latch 17 retains the result of a match operation, which is a search and comparison operation, performed on CAM array 10. The contents of match latch 17 can be used to select CAM words in CAM array 10 for access or are written to response register A 16, response register B 15' or response register C 15". Match latch 17 can be cleared by either a power-on reset or a reset operation initiated by the RST/ input in general control block 30. If a match is found, an inverted match output (MATCH/) is asserted.

Response register A 16 can have each bit assigned to each CAM word in CAM array 10. For illustration, if CAM array 10 contains 1024 CAM words, then although response register A 16 can have more than 1024 bits, it typically contains 1024 bits. Response register A 16 can have one or more bits set to logic 1 or contain all zero bits. Response register A 16 can be used to store the result of a match operation. The contents of response register A 16 is automatically prioritized by MRR 13. Response register A 16 can also be the source and/or the destination of a logic operation including a multi-word operation. If GPLB 14 is used in a logic operation, then the output of GPLB 14 can modify the contents of response register A 16. In addition, Response register A 16 can be shifted up or down one bit position per shift instruction. This is useful in initializing CAM array 10, accessing a cascaded CAM array structure or shifting one bit in response register A 16 after a read or a write operation. The most significant bit in response register A 16 can be cleared to access the next CAM word. Response register A 16 is cleared by either a power-on reset or a reset operation initiated by the RST/ input in general control block 30.

Figure 4A:
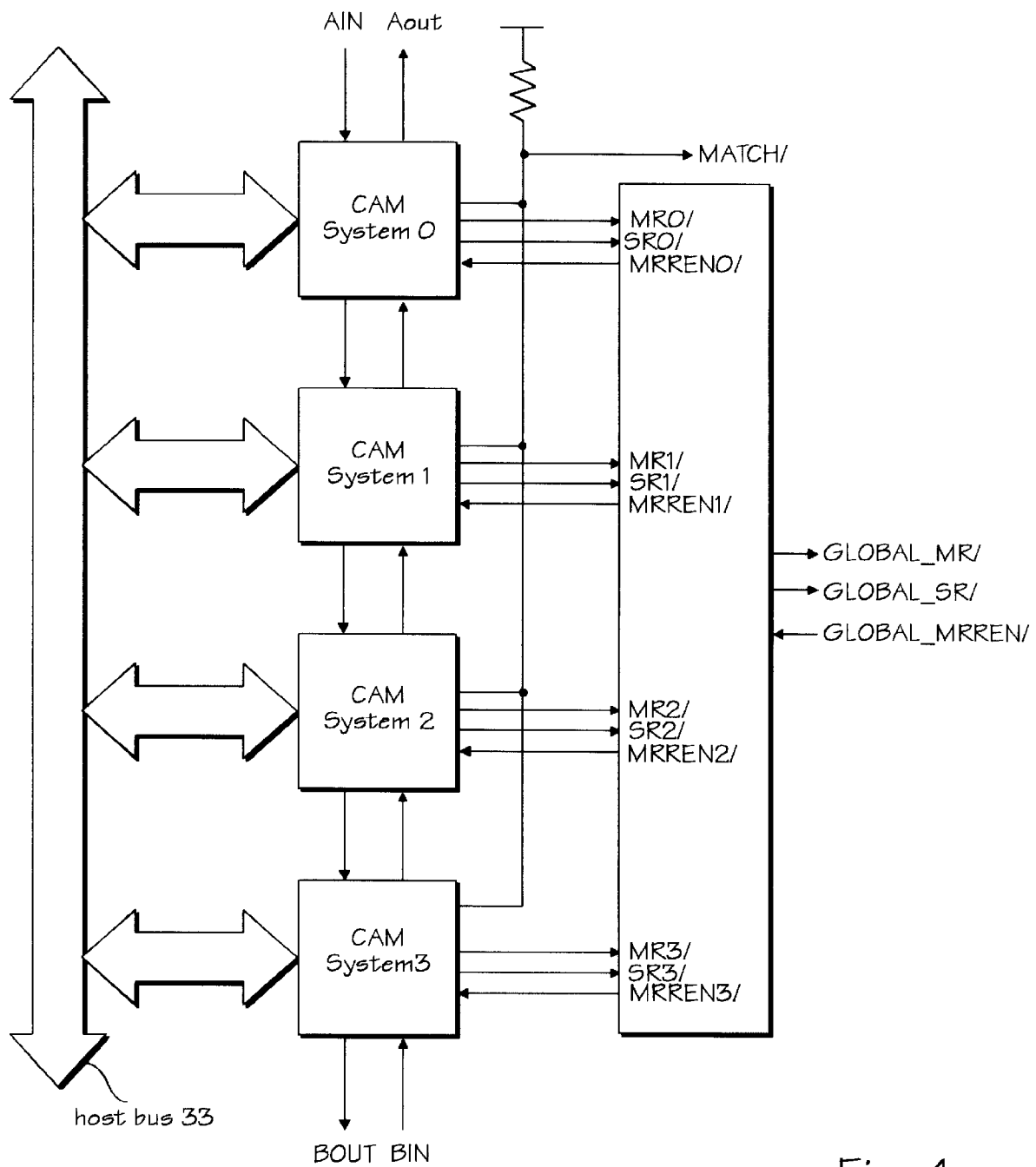
FIG. 4a is a chain of cascaded CAM systems.

An above-input (AIN) signal, an above-output (AOUT) signal, a below-input (BIN) signal and a below-output (BOUT) signal of response register A 16 are utilized when multiple CAM systems are cascaded as shown in FIG. 4a. An AIN signal is coupled to a BOUT signal of the next higher priority CAM system in a cascaded CAM system chain. An AOUT signal is coupled to a BIN signal of the next higher priority CAM system in a cascaded CAM system chain. A BIN signal is connected to an AOUT of the next lower priority CAM system in a cascaded CAM system chain. Finally, a BOUT signal is connected to an AIN of the next lower priority CAM system in a cascaded chain. A cascaded CAM system will be discussed in detail later.

MRR 13 is used as a priority encoder for response register A 16. If response register A 16 is non-zero, MRR 13 has one bit set corresponding to the most significant bit set in response register A 16. On the other hand, if response register A 16 contains all zero bits, then MRR 13 is set to all zeros, and no CAM word is selected for a read operation. When the most significant bit set in response register A 16 is cleared, MRR 13 reprioritizes the contents of response register A16 and selects the next CAM word for access. After MRR 13 processes the contents of response register A 16, MRR 13 sends the result to multiplexer 12. The result of MRR 13 typically contains, although is not restricted to, the same number of bits as the number of CAM words in CAM array 10. An inverted some-response (SR/) output is asserted if response register A 16 contains at least one bit set, indicating that at least one match is found. SR/ is deasserted during reset. An inverted multiple-response (MR/) output is asserted if response register A 16 contains two or more bits set indicating that more than one match is found. MR/ is deasserted during reset. An inverted multiple response resolver enable (MRREN/) input has no effect on SR/ or MR/. If the MRREN/ input is deasserted, MRR 13 becomes disabled, setting MRR 13 to all zeros. Disabling MRR 13 is useful in a read operation when multiple CAM systems are cascaded, as will be discussed.

Each of response register B 15' and response register C 15" can have, but is not restricted to, the same number of bits as the number of CAM words in CAM array 10. Response register B 15' and response register C 15" may contain identical data. Each register can be used to store the result of a match operation and act as the source and/or destination of a logic operation. The contents of either response register B 15' or response register C 15" can be modified by the output of GPLB 14 if either response register B 15' or response register C 15" is selected to be the destination of the logic operation of GPLB 14.

GPLB 14 contains various general purpose logic components to process contents of any single register or any combination of registers selected from response register A 16, response register B 15' and response register C 15". GPLB 14 consists of a plurality of arithmetic logic units (ALUs) with one ALU assigned to each CAM word in CAM array 10. GPLB 14 can perform one of many different Boolean operations on the contents of response register A 16, response register B 15' and response register C 15". In the preferred embodiment of the present invention, there are 256 different Boolean operations. The output of GPLB 14 can be stored back to one of the response registers 16, 15' and 15" or used to select CAM word(s) in CAM array 10 during a write operation. All ALUs perform the operation specified by the instruction.

Continuing to refer to FIG. 1, another component of general register logic block 11 is supply ones unit 19. Supply ones unit 19 is used to provide all ones (or alternatively all zeros if zeros select CAM locations) to select vector 18 so that every CAM word can be selected for a write operation. Supply ones unit 19 can be also used to initialize CAM array 10.

Multiplexer 12 is used to select one of the input devices—match latch 17, MRR 13, GPLB 14 and supply ones unit 19—and to create an output called select vector 18 containing the data from the selected input device. Select vector 18 is then used to select corresponding CAM word(s) for access. When multiplexer 12 selects match latch 17, the contents of match latch 17 are transferred to select vector 18. Multiplexer 12 can also select MRR 13 to transfer the result of MRR 13 to select vector 18. When multiplexer 12 selects GPLB 14, the result of a logical combination of response registers 16, 15' and 15" is transferred to select vector 18. Finally, when multiplexer 12 selects supply ones unit 19, all bits in select vector 18 become logic 1.

4) GENERAL CONTROL BLOCK

Continuing to refer to FIG. 1, general control block 30 has, in the preferred embodiment of the invention, an inverted multiple response resolver enable (MRREN/) signal, a clock (CLK) signal, an inverted chip select (CS/) signal, an inverted reset (RST/) signal, an inverted write (WE/) indicator, an inverted output enable (OE/), an access control code (AC), a register select (RS) code, an inverted ready output (RDY/) and a state machine 29. General control block 30 supplies various input/output control signals to the CAM system to enable or disable registers and logic units in the CAM system and receives externally supplied control signals (e.g., CLK, CS/, RST/, WE/, OE/, AC, and RS) from the external logic to which the CAM system is coupled.

Figure 3A:
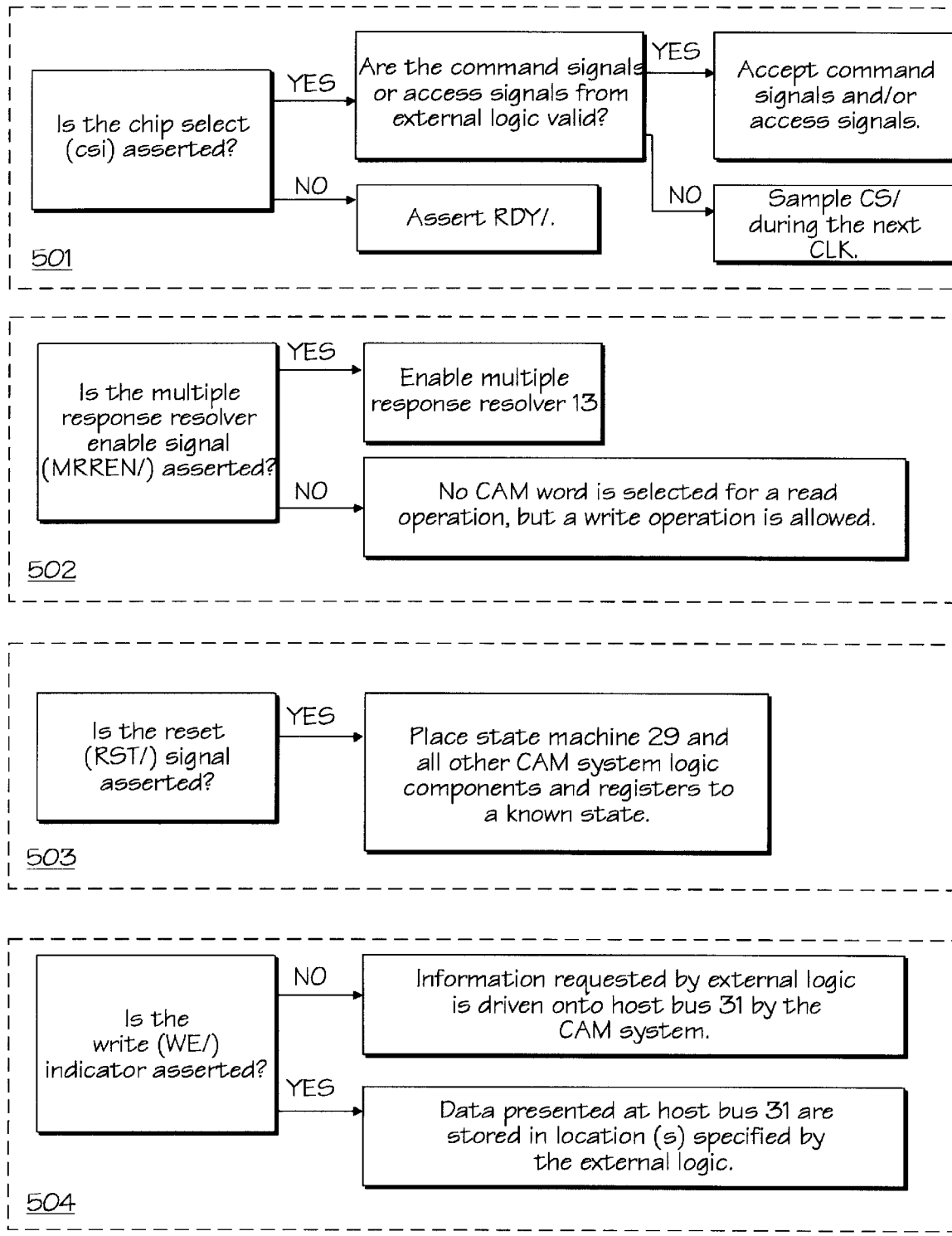
FIG. 3a is a first set of the states implemented in state machine 29.
Figure 3B:
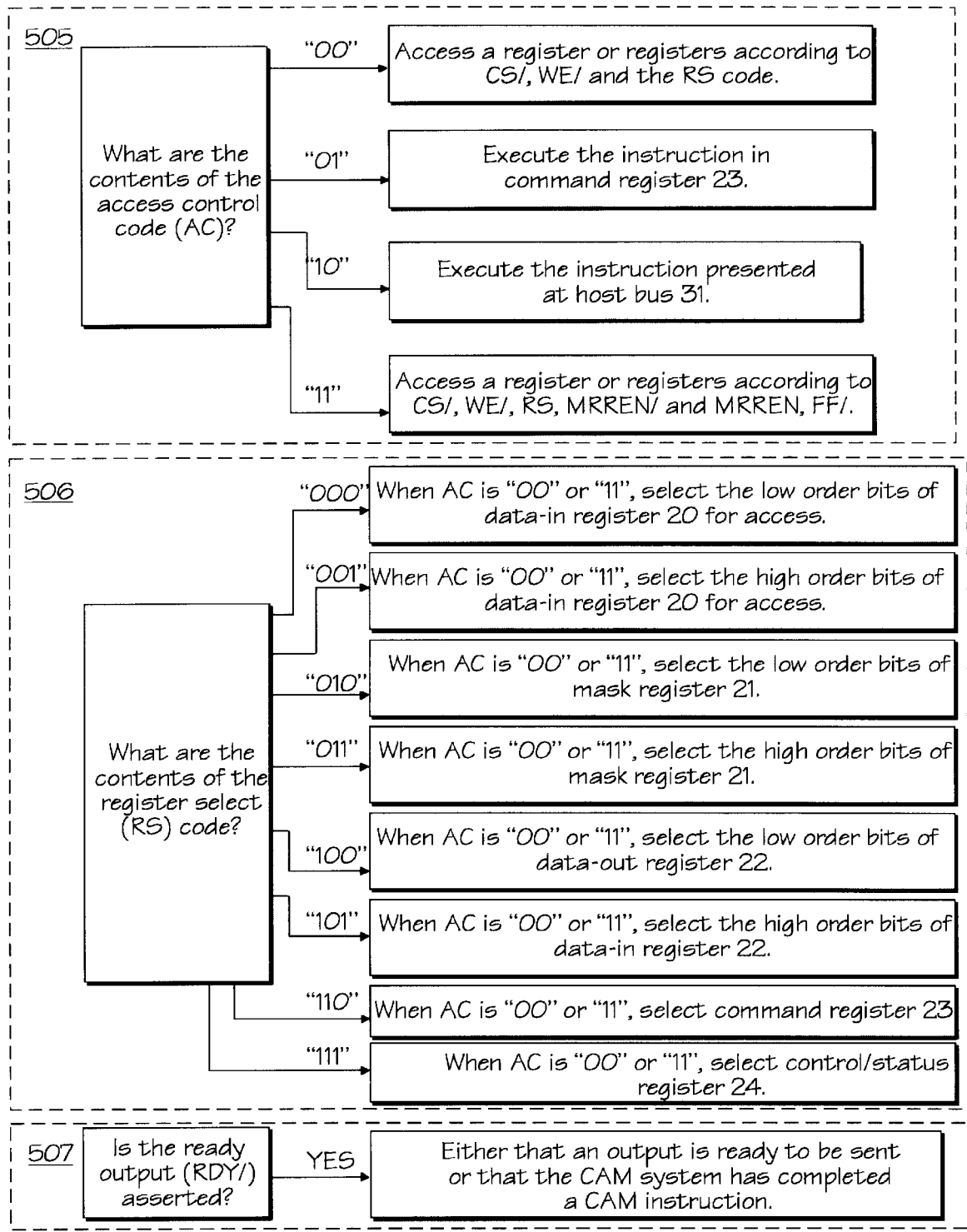
FIG. 3b is a second set of the states implemented in state machine 29.

FIGS. 3a and 3b show the states that are implemented in state machine 29.

Referring to a block 501 in FIG. 3a, assertion of the chip select (CS/) signal, which is a logic LOW in the preferred embodiment of the present invention, at the rising edge of CLK enables the on-chip logic components to accept commands and accesses initiated by external logic. If the command or access is valid, then CS/ will not be sampled again until the rising edge of CLK after the operation is completed. If the command or access is invalid, then CS/ will be sampled on the next rising edge of CLK.

Referring to block 502 in FIG. 3a, if MRREN/ is asserted, indicating a logic LOW in the preferred embodiment of the present invention, at the rising edge of CLK in the first clock cycle of an instruction, then MRR 13 is enabled, and the CAM word corresponding to the most significant bit set in response register A 16 is selected for a read operation. If MRREN/ is deasserted, indicating a logic HIGH in the preferred embodiment of the present invention, MRR 13 is disabled, and no CAM word can be selected for a read operation regardless of the contents of response register A 16. MRREN/ affects register access when access control codes are set to "11". MRREN/ is also loaded into a MRREN_FF/ internal flip—flop when a READ, READ-SHIFT or READSNEXT instruction is executed.

CLK is a clock signal used as a timing signal by the CAM system logic components.

Referring to block 503, assertion of the reset (RST/) signal for one or more consecutive rising edges of CLK causes a CAM system to complete a reset operation, which places state machine 29 and all other CAM system logic components to a known state. Match latch 17 is cleared so that MATCH/ becomes a logic HIGH and stays HIGH until the first match operation with a non-empty outcome. Response register A 16 is cleared to zero so that MR/ and SR/ become HIGH. AOUT and BOUT become logic LOW as a result of response register A 16 being cleared. The SR/, MR/, MATCH/ and MRREN_FF/ bits in the control/status register are set to one while the AOUT and BOUT bits in the control/status register are set to zero.

Referring to block 504, the write (WE/) indicator is sampled in the same fashion as CS/ is sampled. If WE/ is HIGH, information requested by logic external to the CAM system will be driven onto host bus 31 by the CAM system. If WE/ is LOW, then data presented at host bus 31 will be stored in location(s) specified by the external logic. When the output enable (OE/) signal is deasserted, host bus 31 will be placed in a three-state condition.

Now referring to block 505 in FIG. 3b, the access control code (AC), which is sampled in the same fashion as CS/ is sampled, specifies the type of current register access. For illustration, when AC is "00", a register access is based on CS/, WE/ and the RS code. When AC is "01" the CAM system executes the instruction in command register 23. When AC is "10", the CAM system executes the instruction presented at host bus 31. Finally, when AC is "11", a register access is based on CS/, WE/, RS, MRREN/ and MRREN_ FF/. When AC is "11", the contents of data-in register 20, mask register 21 or command register 23 can be read based on CS/ and MRREN/. Also when AC is "11", data-out register 22 can be read based on CS/ and MRREN_FF/. In addition, control/status register 24 can be read or written when AC is "11".

Referring to block 506, the register select (RS) code, which is also sampled in the same fashion as CS/ is sampled, is used to select a register for access. For illustration, when AC is "00" or "11", the register selected by the RS code is accessed. When the RS code is "000", the low order bits of data-in register 20 are selected. If data-in register 20 contains 42 bits, and host bus 31 is 32 bit wide, then the low order 32 bits of data-in register 20 will be selected. When the RS code is "001", the high order bits of data-in register 20 are selected for access. When the RS code is "010", the low order bits of mask register 21 are selected. When the RS code is "011", then the high order bits of mask register 21 are selected. When the RS code is "100", the low order bits of data-out register 22 are selected. When the RS code is "101", the high order bits of data-out register 22 are selected. When the RS code is "110", command register 23 is selected for access. When the RS code is "111", control/status register 24 is selected for access.

Referring to block 507, the ready output (RDY/) is asserted when an output is ready to be sent or when the CAM system completes a CAM operation specified by a CAM instruction. RDY/ is typically asserted during the last clock cycle of the current operation that is being performed. In the preferred embodiment of the present invention, when AC is "00", RDY/ will be generated regardless of whether an active CS/ is present. In all other access modes, CS/ must be active in order for RDY/ to be generated.

State machine 29 consists of various logic units to process signals coupled to State machine 29 and to interface input/output signals of State machine 29 with general register logic block 11 and with interface register logic block 28. This state machine 29 generates the necessary control signals for logic blocks 11 and 28 and the various registers within these blocks and the multiplexer 12.

B) FUNCTIONAL DESCRIPTION

1) CASCADING MULTIPLE CAM SYSTEMS

Multiple CAM systems can be cascaded to increase the depth of CAM array 10 (e.g., to increase the number of CAM words). For instance, in FIG. 4a, four CAM systems are cascaded. If each CAM system has 1024 CAM words in its CAM array, then the cascaded CAM system chain provides 4096 (1024 * 4) CAM words. To increase the number of CAM words further, more CAM system can be added. It should be noted that a CAM system in a cascaded chain does not need the same number of CAM words in its CAM system as other CAM systems in the cascaded chain. A cascaded structure provides means to access a single CAM system or multiple CAM systems.

Cascading multiple CAM systems is accomplished by connecting the top-most and the bottom-most bits of a response register A of a CAM system to the upper and lower CAM system in the cascaded chain, respectively. For example, in FIG. 4a, the AIN signal of CAM system 1 is connected to the BOUT signal of CAM system 0. The AOUT signal of CAM system 1 is connected to the BIN signal of CAM system 0. The BOUT signal of CAM system 1 is connected to the AIN signal of CAM system 2. The BIN signal of CAM system 1 is coupled to the AOUT of CAM system 2. In addition, each of the AIN signal of the first CAM system (CAM system 0) and the BIN signal of the last CAM system (CAM system 3) is typically connected to the output of a user-programmable flip—flop or register. The chain structure as shown in FIG. 4a can provide cascading capability during shift, select next and multi-word operations.

Continuing to refer to FIG. 4a, in a cascaded system, the MATCH/ outputs of all CAMs can be tied together to provide a cumulative match signal.

By controlling MRREN/ signals of CAM systems in a chain, one can read a CAM word from one CAM system while disabling other CAM systems in the chain. As discussed before, the SR/ and MR/ signals reflect the state of MRR 13 in FIG. 1. The MRREN/ signal can enable or disable MRR 13. If MRREN/ is HIGH, then no CAM word is read from the CAM array. On the other hand, if MRREN/ is LOW, then a CAM word can be read from the CAM array. In a cascaded system, additional signals such as global_MR/, global_SR/ and global_MRREN/ are provided to integrate individual MR/, SR/ and MRREN/ signals as illustrated in FIG. 4a. In operation, each MRREN/ may be set HIGH or LOW according to the logic described below:

MRREN0/ is LOW if SR0/ is LOW, and global_MRREN/ is LOW.

MRREN1/ is LOW if SR0/ is HIGH, SR1/is LOW, and global_MRREN/ is LOW.

MRREN2/ is LOW if SR0/ is HIGH, SR1/ is HIGH, SR2/ is LOW, and global_MRREN/ is LOW.

MRREN3/ is LOW if SR0/ is HIGH, SR1/ is HIGH, SR2/ is HIGH, and global_MRREN/ is LOW.

2) MULTI-WORD OPERATION

Figure 4B:
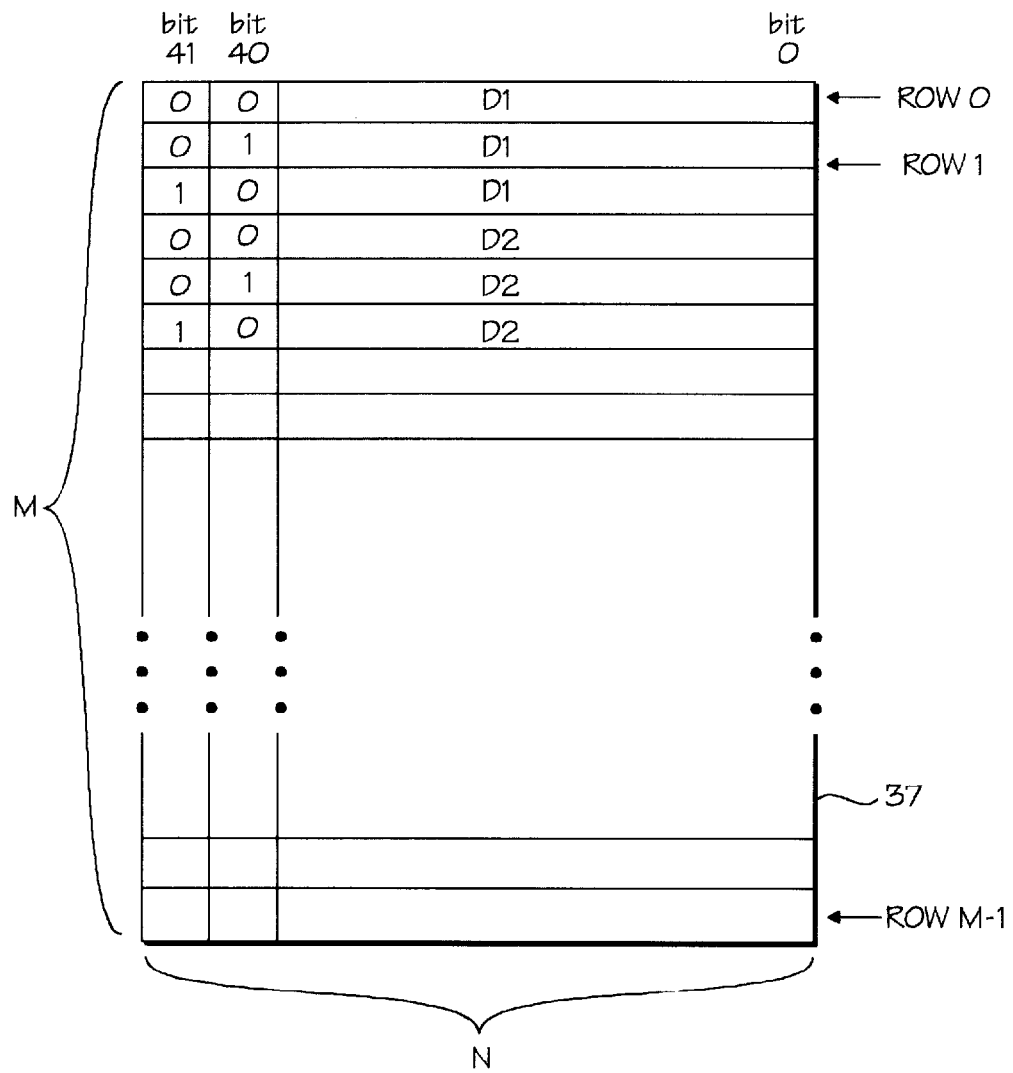
FIG. 4b presents a multi-word feature of a CAM array.

If a data pattern is longer than the length of a CAM word, then the data pattern can be stored in two or more adjacent CAM words that are linked to form a multi-word storage unit. For example, if the length (N) of a CAM word of CAM array 37 in FIG. 4b is 42-bit long, and the data pattern contains 100 bits, then the data pattern will occupy three CAM words. Thus, in FIG. 4b, a data pattern D1 occupies three CAM words, and the next data pattern D2 occupies the next three CAM words following the last CAM word occupied by D1. This multi-word feature allows a match operation to be performed on data of arbitrary length independent of the number of bits each CAM word contains in a given array. In one embodiment, the length of data pattern D1 may be different from the length of data pattern D2.

Matching a data pattern such as D1 in FIG. 4b against external arguments requires multiple match cycles—one match cycle for each CAM word. A multi-word means collates the match results and provides a cumulative match indicator. For illustration, if data pattern D1 occupies three CAM words as in FIG. 4b, and if a CAM word is 42-bit long, then the first CAM word that D1 occupies is identified by an ID of 00 in bit positions 40 and 41. Similarly, the second and the third CAM words of D1 are identified by ID codes 01 and 10, respectively. Because the data pattern is three words long, three match cycles are needed to match them against an external argument. The first match is conducted with a search pattern containing 00 at bit positions 40 and 41 plus 40 bits of data pattern and with response register A 16 as the response register. The second match is conducted with a search pattern containing an ID of 01 at bit positions 40 and 41 plus 40 bits of data pattern and with response register A 16 as a "multi-word" response register. By specifying response register A 16 as the "multi-word" response register, the current match result of each CAM word (e.g., word x) in CAM array 10 is logically ANDed with the previous match result of the CAM word above it (e.g., word x-1) before they are stored into response register A 16. The previous match result of CAM word x is stored in bit position x-1 of response register A16.

Figure 5C:
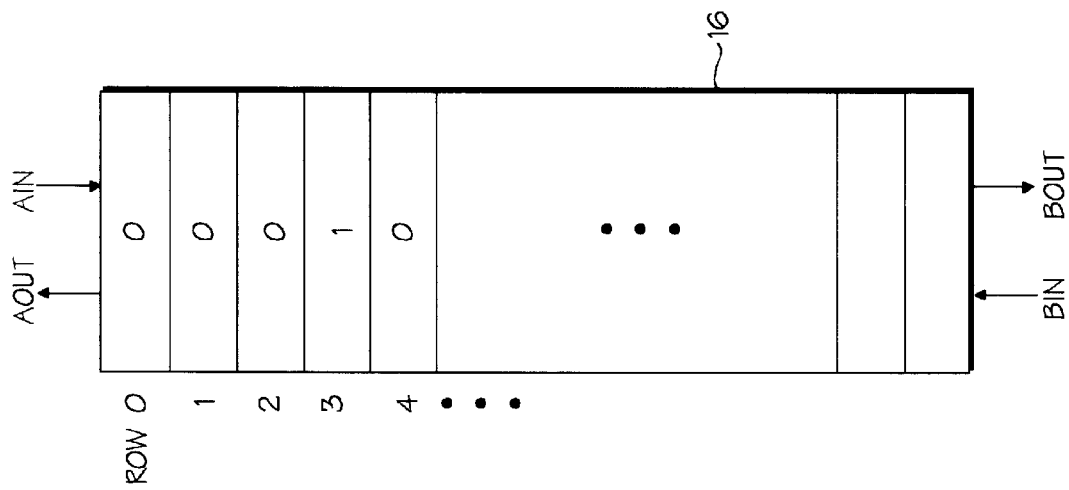
FIG. 5c is the contents of a response register A after a second match.
Figure 5B:
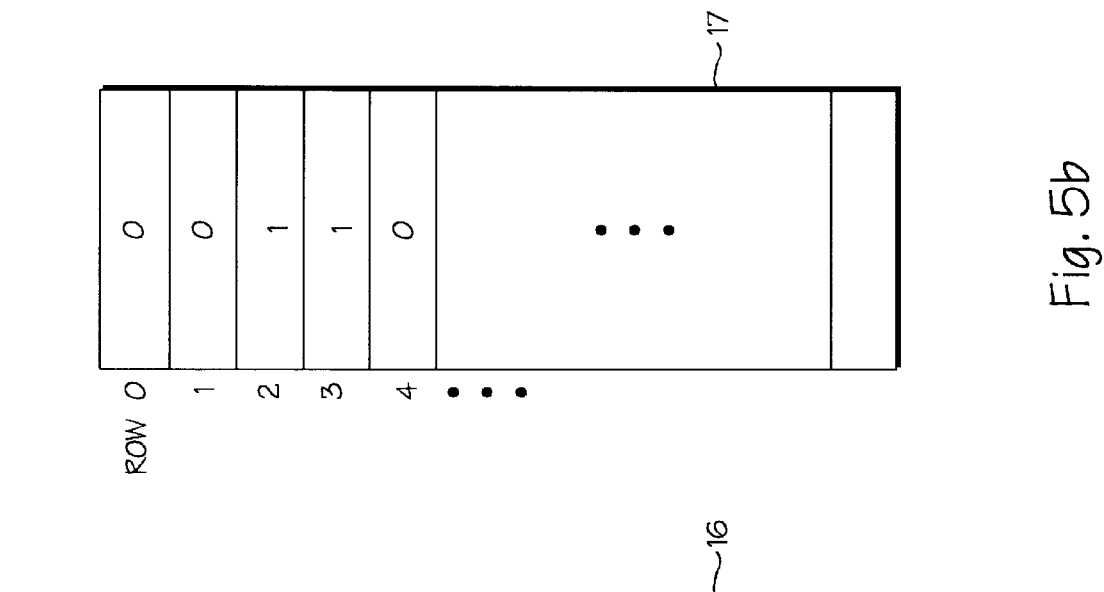
FIG. 5b is the contents of a match latch after a second match.
Figure 5A:
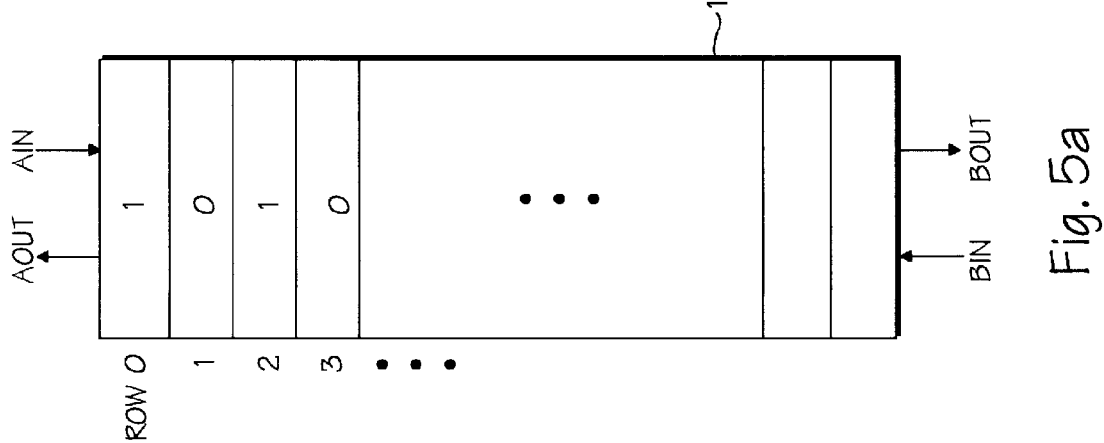
FIG. 5a is the contents of a response register A after a first match.

This is illustrated in FIGS. 5a–5c. FIG. 5a shows the contents of response register A 16 after the first match. FIG. 5b shows the contents of match latch 17 after the second match. When response register A 16 is specified as the "multi-word" response register, the contents of each row of match latch 17 are ANDed with the contents of each row above the current row of response register A 16. For example, the contents of row 1 of match latch 17 in FIG. 5b, which is 0 in this case, is ANDed with the contents of row 0 of response register A 16 in FIG. 5a, which is 1. The result (0) of the AND operation is written to row 1 of response register A 16, as shown in FIG. 5c. Similarly, the contents of row 3 (1) of match latch 17 is ANDed with the contents of row 2 (1) of response register A 16, and the result (1) is stored in row 3 of response register A 16. The contents of the other rows are also ANDed in a similar manner. The contents of row 0 of match latch 17 is ANDed with the contents of AIN of response register A 16.

The third match is processed in a similar way as the second match except with an ID code of 10 at bit positions 40 and 41 in the search pattern. After the third match, the only data pattern(s) which matched all three search arguments are identified by a set bit (1) in response register A 16.

3) ACCESSING THE CAM ARRAY

A CAM system according to the present invention incorporates a select vector to choose one or more CAM words in CAM array 10 for access. A Select vector 18, which is the output of multiplexer 12, has at least the same number of bits as the number of CAM words in CAM array 10 so that each bit in select vector 18 can be assigned to each CAM word in CAM array 10. For instance, if a CAM array 10 has M CAM words, then a select vector 18 has at least M bits. If there are 1024 CAM words in CAM array 10, then select vector 18 is 1024-bit long so that there is one-to-one correspondence between 1024 bits in select vector 18 and 1024 CAM words in CAM array 10. Although a select vector usually contains exactly the same number of bits as the number of CAM words in a CAM array, select vector 18 may have more bits than the number of CAM words in CAM array 10, in which case, the extra bits in select vector 18 will not be used to access CAM words. So if there are 600 bits in select vector 18, but there are only 512 CAM words in CAM array 10, then the extra 88 bits (600–512) are not used in accessing CAM words. But select vector 18 cannot have less number of bits than the total number of CAM words in CAM array 10 because in this case, those CAM words without corresponding select vector bits cannot be accessed.

Select vector 18 has four essential functions: First, select vector 18 (which is typically a signal presented to the CAM 10) can select one or more CAM words for a write operation because of its one-to-one correspondence between the bits in select vector 18 and the CAM words in CAM array 10. Thus, a write operation can be performed in a single instruction multiple data (SIMD) fashion. The contents of the select vector 18 determine which CAM word(s) will be accessed. For instance, if the first bit of select vector 18 is a logic 1, then the first CAM word of CAM array 10 will be accessed. If bit positions 0, 4, 10, 20 and 87 of a select vector 18 are logic 1, then the CAM words of a CAM array 50 at positions 0, 4, 10, 20 and 87 will be accessed as shown in FIGS. 6*a* and 6*b*. In FIG. 6*b,* letter "A" is written on the first, fifth, eleventh, twenty-first and eighty-eighth CAM words in CAM array 50 to indicate those CAM words are being accessed.

During a write operation if multiplexer 12 selects match latch 17 holding the result of the most recent match operation, select vector 18 will contain one or more bits corresponding to the CAM word(s) previously matched in CAM array. The contents of either data-in register 20 or host bus 31 according to the instruction will be stored into the CAM word(s) selected by match latch 17.

On the other hand, during a write operation if multiplexer 12 selects MRR 13, then select vector 18 will have only one bit set for the one CAM word indicated by MRR 13, or select vector 18 will have no bits set because all bits in MRR 13 are zeros. The contents of either data-in register 20 or host bus 31 will be stored into the CAM word selected by MRR 13. However, if the MRREN/ signal of MRR 13 is deasserted, then no location will be written.

During a write operation if multiplexer 12 selects GPLB 14, then the result of the logic function specified in the instruction determines the CAM word(s) to be written. Select vector 18 will contain the result of GPLB 14, and the contents of either data-in register 20 or host bus 31 will be stored into the CAM word(s) selected by GPLB 14.

During a write operation if multiplexer 12 selects supply ones unit 19, then select vector 18 will be set to all ones in the preferred embodiment, and the contents of either data-in register 20 or host bus 31 will be stored into every CAM word in CAM array 10.

Second, select vector 18 can be used to select one CAM word for a read operation. During a read operation, one bit of select vector 18 is set according to the output of MRR 13, and the contents of the selected CAM word is transmitted to data-out register 22 and/or to host bus 31 directly. However, if the result of MRR 13 is all zero either because response register A 16 contains all zero bits or because the MRREN/ signal of MRR 13 is deasserted, then no CAM word will be selected for reading.

Third, select vector 18 can also be the data source for a write operation to response register A 16, response register B 15' or response register C 15".

Figure 7A:
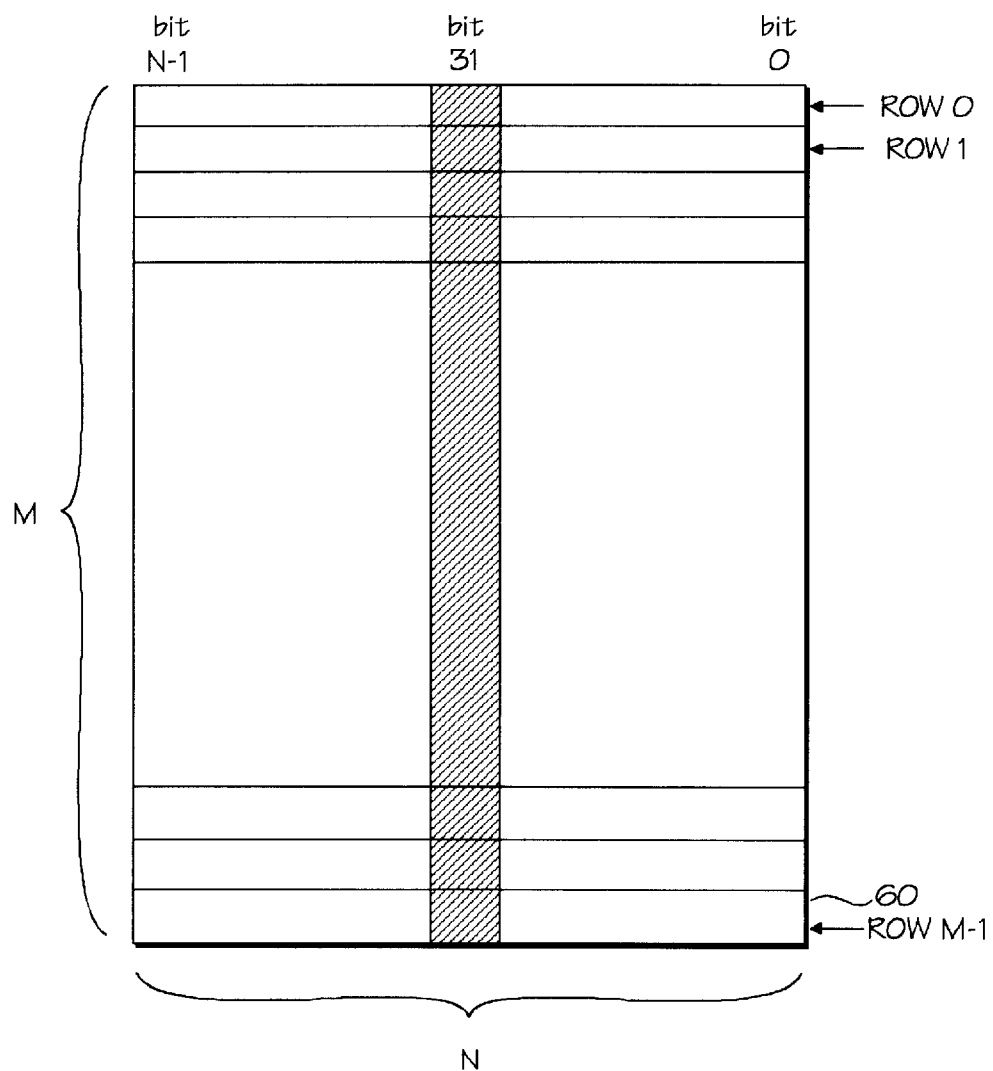
FIG. 7a is a CAM array wherein column 31 is selected for a write operation.
Figure 7B:
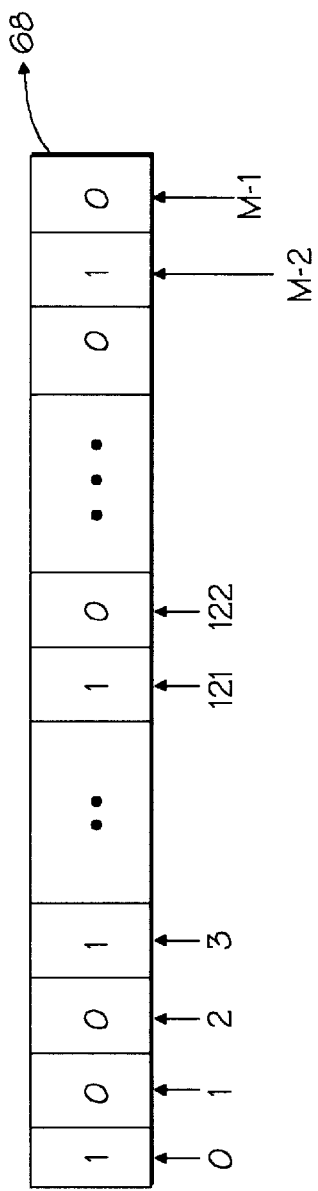

Finally, the contents of select vector 18 can be written into a whole column of CAM array 10. For illustration, FIG. 7*a* presents a CAM array 60 with M CAM words, each CAM word having N number of bits. After a column such as column 31 is selected, the contents of a select vector 68 in FIG. 7*b* are written to column 31 shown in FIG. 7*c*. Logic values "1" and "0" are inserted in select vector 68 and column 31 to merely show one-to-one correspondence between select vector 68 and column 31. The logic values of column 31 are not limited to the example shown in FIG. 7*c*.

4) MATCH OPERATIONS

A CAM system according to the present invention supports two types of match operations: a Bit Match operation and a Multiple Valued Variable (MVV) Match operation. A match operation can be performed in a SIMD fashion so that all of the stored CAM words can be compared to a data pattern in a single operation.

In a Bit Match operation, a data pattern qualified by a mask pattern is compared against the contents of CAM array 10 in FIG. 1 on a bit-by-bit basis. Masked bits (e.g., bits set to 1) in the mask pattern are not compared. The result of the Bit Match operation is stored into Match Latch 17 and one of the response registers 15', 15" and 16 as specified by a MATCH instruction. The source of the data pattern is also specified in a MATCH instruction. The following are the possible sources of a data pattern: the contents of data-in register 20, data presented at host bus 31, an internally generated data pattern containing all zeros, or an internally generated data pattern containing all ones. The internally generated data patterns are produced in data-source logic unit 25.

In addition, a MATCH instruction specifies the source of the mask pattern. The following are the possible sources of a mask pattern: the contents of mask register 21, an internally generated fill pattern, an internally generated mark pattern, or the logically ANDed product of an internally generated mask pattern and the contents of mask register 21.

Two types of internally generated mask patterns are supported: fill patterns and mark patterns. A fill pattern may consist of (1) one or more zeros in low order bit positions followed by all ones, (2) one or more ones in low order bit positions followed by all zeros, (3) all zeros, or (4) all ones. For example, a fill pattern may look like 1111 . . . 110, 11110 . . . 000,0000 . . . 001, 0001 . . . 111, 000 . . . 000 or 111 . . . 11. The number of ones and zeros in a pattern is specified in the MATCH instruction. A mark pattern consists of a single one embedded in a word of zeros or a single zero embedded in a word of ones. The position of the single mark bit and the binary value of the remaining word are specified in the MATCH instruction. Some examples of a mark pattern may be 111 . . . 11011, 011 . . . 111 or 00100 . . . 000.

In a Multiple Valued Variable (MVV) Match operation, MVVs are formed by grouping two or more CAM bits in each CAM word, and these MVVs are compared with the MVVs formed from the contents of data-in register 20 and mask register 21. A quad variable is an example of a MVV. For example, if a CAM word is 42-bit long, then each CAM word can be paired to form 21 2-bit quad values. Each quad variable supports four states. For example 00 can represent logic zero (0), 11 can represent logic one (1), 10 can represent don't care (X) and 01 can represent never match (N).

C) INSTRUCTION SET

FIG. 10 describes an example of an instruction set for the CAM system in FIG. 1 according to the present invention. An NOP instruction performs no operation.

A SHIFT instruction either shifts response register A 16 up or down by one bit position according to the instruction. This is useful for initializing CAM array 10 in FIG. 1 or accessing data patterns stored in multiple adjacent CAM words. The SHIFT operation can be combined with a read (READSHIFT) or write (WRITESHIFT) operation.

An SNEXT instruction (which may be referred to as a "selectnext instruction") clears the most significant bit set in response register A 16. If multiplexer 12 selects MRR 13, then the SNEXT instruction, in effect, selects the next CAM word indicated by response register A 16 for access. The SNEXT operation can also be combined with a read (READSNEXT) or a write (WRITESNEXT) operation.

A MOVE instruction writes the contents of select vector 18 to response register A 16, response register B 15' or response register C 15" as specified in the instruction.

A READ instruction uses response register A 16 and MRR 13 to read one CAM word. MRR 13 prioritizes the contents of response register A 16. If response register A 16 has one or more bits set to logic 1, then MRR 13 has one bit set that corresponds to the highest priority bit set in response register A 16. Thus, a CAM word corresponding to the highest priority bit set in response register A 16 will be read from CAM array 10. CAM array 10 can either transmit the contents of the selected CAM word to data-out register 22 and/or to host bus 31 directly. If, however, response register A 16 contains all zero bits, then MRR 13 sends all zeros to multiplexer 12, and no CAM word is selected for reading.

A READSHIFT instruction combines the READ instruction and the SHIFT instruction. After a read operation, response register A 16 is shifted either up or down by one bit according to the instruction.

A READSNEXT instruction combines the READ instruction and the SNEXT instruction. When the READSNEXT instruction is called, a read operation is performed first, and then the most significant bit set in response register A 16 is cleared.

A WRITE instruction performs a masked write operation to every CAM word indicated by a bit set in select vector 18. Multiplexer 12 selects an input device from the group consisting of match latch 17, MRR 13, GPLB 14 and supply ones unit 19, and passes the data from the selected input device to select vector 18. A masked data pattern from data-source logic unit 25 and from mask-source logic unit 26 is written to every CAM word in CAM array 10 designated by select vector 18.

A WRITESHIFT operation combines the WRITE instruction and the SHIFT instruction. After a write operation, response register A 16 is shifted either up or down by one bit according to the instruction.

A WRITESNEXT instruction combines the WRITE instruction and the SNEXT instruction. When the WRITESNEXT instruction is executed, a write operation is performed first, and then the most significant bit set in response register A 16 is cleared.

A WRITECOL instruction writes the contents of select vector 68 as a column to CAM array 60 as shown in FIGS. 7a, 7b and 7c. For every CAM word, one bit from select vector 68 is written to a CAM word in a bit position specified by the instruction. As a consequence, CAM array 60 can be used as storage for the contents of the select vector.

A MATCH instruction exercises the content addressable function by performing a masked comparison of data in every CAM word with a specified search pattern provided by data-source logic unit 25 and mask-source logic unit 26 in FIG. 1. Upon completion of the MATCH instruction, the results are stored in match latch 17, the contents of which can be written to response register A 16, response register B 15' or response register 15". It should be noted that a MATCH instruction that searches for logic 1's in a specified bit position by masking all other bit positions is equivalent to a read column instruction.

D) INSTRUCTION FORMAT

An instruction for a CAM system according to the present invention may contain the following format as shown in FIG. 8. It should be noted that this format is shown as an example, and there are numerous other instruction formats that the present invention can realize.

An OPCODE field in FIG. 8 contains binary codes for one of the instructions. Instructions may be represented by opcodes as shown in FIG. 9. In this example, opcode "00001" represents the SHIFT instruction, opcode "01100" represents the MATCH instruction.

A RESPREG selects one of the three response registers 15', 15" and 16 or response register A 16 as a "multi-word" response register.

A SELVECT field specifies an input device to be selected by multiplexer 12. The input device that can be specified in the SELVECT field is one of the following: match latch 17, MRR 13, GPLB 14 and supply ones unit 19.

A DATASRC field specifies the source of a data pattern to be selected by data-source logic unit 20 for the WRITE or MATCH instruction. Data-source logic unit 25 may choose any of the four possible data sources: data-in register 20, host bus 31, internally generated patterns consisting of all ones, or internally generated patterns consisting of all zeros.

A RESV field is an empty field that can be reserved for other purposes.

A MSKSRC field specifies the source of a mask pattern to be selected by mask-source logic unit 26 for the WRITE or MATCH instruction. Mask-source logic unit 26 can select any of the following sources: mask register 21, an internally generated fill pattern, an internally generated mark pattern, or the logically ANDed product of an internally generated pattern and the contents of mask register 21.

A DIR field specifies the direction of the SHIFT operation. For instance, a bit 0 may indicate shifting of the contents of response register A 16 up by one bit. A bit 1 may indicate shifting of the contents of response register A 16 down by one bit.

A GPLBTERMS field specifies one of the Boolean operations to be performed by GPLB 14 on the contents of the response registers 15', 15" and 16. In the preferred embodiment of the present invention, the output of an 8-bit GPLBTERMS field may be determined by:

| (f7*R3 *R2 * R1) | + | (f6*R3 *R2 * R1/) | + |
| (f5*R3 *R2/* R1) | + | (f4*R3 *R2/* R1/) | + |
| (f3*R3/*R2 * R1) | + | (f2*R3/*R2* R1/) | + |
| (f1*R3/*R2/* R1) | + | (f0*R3/*R2/* R1/) | |

Where f7–f0 are the 8 bits of the GPLBTERMS field wherein f0 is the most significant bit; R1, R2 and R3 are the contents of the response registers 15', 15" and 16, respectively; and R1/, R2/ and R3/ are the inverted contents of the response registers 15', 15" and 16. For example, if R1 is 1000100111, then R/1 is 0111011000.

A MPAT field selects one of the two types of internally generated mask patterns: a fill pattern or a mark pattern. A MPATBIT field specifies the value (1 or 0) of the "fill" bits in a fill pattern or the "mark" bit in a mark pattern. A BITPOS specifies the location of the fill bits or the mark bit. For instance, if the MPAT, MPATBIT and BITPOS fields contain 0 1 5, then a fill pattern is selected with 1's in bit positions 0–5 (e.g., 000 . . . 00111111 where the least significant bit is the right most bit). If the MPAT, MPATBIT and BITPOS fields contain 0 0 41, and a pattern is 42-bits long, then a fill pattern is selected with 0's in bit positions 0–41 (e.g., 000000 . . . 000000). If the MPAT, MPATBIT and BITPOS fields contain 103, then a mark pattern is selected with a zero at bit position 3 in a word of ones (e.g., 1111 . . . 1110111). If the MPAT, MPATBIT and BITPOS fields contain 117, then a mark pattern is selected with a one at bit position 7 in a word of zeros (e.g., 000 . . . 0010000000).

A CAM system of the present invention is ideal for various data intensive computations such as pattern recognition, data base systems, neural networks, text processing, digital noise suppression, and address matching in Local Area Networks.

While the present invention has been particularly described with reference to FIGS. 1–10, it should be understood that the figures are for illustration only and should not be taken as limitations upon the invention. It is further contemplated that many changes and modifications may be made to the invention, by one of ordinary skill in the art, without departing from the spirit and scope of the invention as disclosed herein.

We claim:

1. An associative processing memory system for concurrent data searching and concurrent data processing comprising:
   a content addressable memory (CAM) array having a plurality of storage locations for storing CAM words;
   a multiplexer which executes one of a plurality of input devices attached to said multiplexer and passes an output of one of said plurality of input devices, said multiplexer coupled to said CAM array;
   a match circuit which executes a match instruction for performing a comparison of data in every CAM word in said CAM array with a search pattern, said match circuit coupled to said CAM array;
   a read circuit which executes a read instruction for reading one CAM word from said CAM array wherein said CAM word is selected in accordance with said multiplexer output, said read circuit coupled to said CAM array;
   a write circuit which executes a write instruction for performing a masked write operation to every CAM word indicated by a bit set in a select vector, said write circuit coupled to said CAM array; and
   an interface register logic block coupled to said CAM array, said interface register logic block comprising:
     a command register which stores an instruction, and
     a control and status register which stores control and status information.

2. The associative processing memory system of claim 1 further comprising:
   a shift-up circuit which executes a first shift instruction for shifting said first response register up by one bit position, said shift-up circuit coupled to said first response register;
   a shift-down circuit which executes a second shift instruction for shifting said first response register down by one bit position, said shift-down circuit coupled to said first response register;
   a clear circuit which executes an instruction for clearing the most significant bit set in said first response register, said clear circuit coupled to said first response register;
   a move circuit which executes an instruction for writing the contents of said select vector to said first response register, said move circuit coupled to said select vector and to said first response register; and
   a write-column circuit which executes an instruction for writing the contents of said select vector to a column in said CAM array, said write-column circuit coupled to said CAM array and to said select vector.

3. The associative processing memory system of claim 2 further comprising:
   a circuit for executing an instruction for performing no operation, said circuit coupled to said CAM array;
   a read-shift circuit which executes a read and shift instruction for combining said read instruction and one of said first and second shift instructions wherein during said read and shift instruction, a value stored in said first response register is shifted either up or down by one bit after said read instruction is executed, said read-shift circuit coupled to said CAM array and to said first response register;
   a read and clear circuit which executes a read and clear instruction for combining said read instruction and said instruction for clearing the most significant bit wherein during said read and clear instruction, said read instruction is performed first, and then the most significant bit set in said first response register is cleared, said read and clear circuit coupled to said CAM array and to said first response register;
   a write-shift circuit which executes a write and shift instruction for combining said write instruction and one of said first and second shift instructions wherein said value stored in said first response register is shifted either of up and down by one bit after a write operation, said write-shift circuit coupled to said CAM array and to said first response register;
   a write and clear circuit which executes a write and clear instruction for combining said write instruction with said instruction for clearing the most significant bit wherein said write instruction is performed first, and then the most significant bit set in said first response register is cleared, said write and clear circuit coupled to said CAM array and to said first response register.

4. The associative processing memory system of claim 2 wherein one of said first and said second shift instructions is used for initializing said CAM array.

5. The associative processing memory system of claim 2 wherein one of said first and second shift instructions is used to access data patterns stored in multiple adjacent CAM words in said CAM array.

6. The associative processing memory system of claim 2 wherein if said prioritizer is selected, then said instruction for clearing clears the most significant bit in said first response register and selects a next CAM word indicated by said first response register for access.

7. The associative processing memory system of claim 2 wherein when said instruction for writing the contents of said select vector to a column is executed, a bit from said select vector is written to a bit position of a corresponding CAM word wherein said bit position is specified by an instruction, and
   wherein said CAM array is used as a storage of data that has one bit per CAM word.

8. The associative processing memory system of claim 2 wherein said response register is selected from the group consisting of said first response register, a second response register and a third response register.

9. The associative processing memory system of claim 2 wherein said instruction for clearing the most significant bit set in said first response register is used for initializing said CAM array.

10. The associative processing memory system of claim 2 wherein when said instruction for writing the contents of said select vector to a column is executed, a plurality of bits from said select vector is written to a bit position of a plurality of corresponding CAM words wherein said bit position is specified by an instruction.

11. The associative processing system of claim 1 wherein said search pattern for said match instruction is provided by combining a first pattern from a data-source logic unit with a second pattern from a mask-source logic unit,
   wherein said data-source logic unit selects said first pattern from the group of sources consisting of a data pattern in a host bus, a data pattern in a data-in register, all 1's and all 0's, and wherein said mask-source logic unit selects said second pattern from the group of sources consisting of a third pattern in a mask register, a fourth pattern, a fifth pattern, and a logically ANDed product of a sixth pattern and said third pattern in said mask register.

12. The associative processing memory system of claim 11 wherein said fourth pattern comprises a pattern selected from the group consisting of (1) at least one zero in low order bit positions followed by all ones, (2) at least a one in low order bit positions followed by all zeros, (3) all zeros, and (4) all ones, wherein said fifth pattern is one of (1) a single zero embedded in a word filled with ones and (2) a single one embedded in a word filled with zeros.

13. The associative processing memory system of claim 1 wherein said prioritizer prioritizes the contents of said first response register.

14. The associative processing memory system of claim 13 wherein said prioritizer contains one bit set to logic 1, and said bit of said prioritizer corresponds to the highest priority bit set in said first response register, wherein during a read instruction, a CAM word in said CAM array corresponding to said bit of said prioritizer is read from said CAM array.

15. The associative processing memory system of claim 14 wherein said CAM array transmits the contents of said CAM word to one of (1) a data-out register, (2) a host bus, and (3) both said data-out register and said host bus.

16. The associative processing memory system of claim 1 wherein if said first response register contains all zero bits, then no CAM word is selected for reading.

17. The associative processing memory system of claim 1 wherein said select vector contains data selected from the group consisting of a match storage circuit, said prioritizer, a general purpose logic block (GPLB) and a unit supplying predetermined values.

18. The associative processing memory system of claim 1 wherein during said masked write operation, a masked data pattern formed by combining a data pattern from a data-source logic unit and a mask pattern from a mask-source logic unit is written to every CAM word in said CAM array designated by said select vector.

19. An associative processing memory system for concurrent data searching and concurrent data processing comprising:
  a content addressable memory (CAM) array having a plurality of CAM words;
  a multiplexer which executes one of a plurality of input devices attached to said multiplexer and passes an output of one of said plurality of input devices, said multiplexer coupled to said CAM array;
  processing logic coupled to said CAM array and comprising a plurality of response registers, said processing logic executing instructions, said instructions comprising:
    a first field which contains binary codes for one of instructions used for said associative processing memory system;
    a second field which selects one of said plurality of response registers, and
    a third field which specifies one of said plurality of input devices to be selected through said multiplexer; and
  an interface register logic block coupled to said CAM array, said interface register logic block comprising:
    a command register which stores one of said instructions, and
    a control and status register which stores control and status information.

20. The associative processing memory system of claim 19 wherein said instruction fields further comprising:
  a fourth field which specifies a source of a data pattern to be selected by a first logic unit,
  a fifth field which specifies a source of a first pattern to be selected by a second logic unit,
  a sixth field which specifies a direction of a shift instruction,
  a seventh field which specifies one logic operation to be performed by said GPLB on the contents of any of said response registers,
  an eighth field which specifies either of an internally generated second pattern, and an internally generated third pattern,
  a ninth field which specifies either of fill bits in said second pattern and a mark bit in said third pattern, and
  a tenth field which specifies either of locations of said fill bits and a location of said mark bit.

21. The associative processing memory system of claim 20 wherein said instructions include at least:
  an nop instruction,
  a shift instruction,
  a snext instruction,
  a move instruction,
  a read instruction,
  a read shift instruction,
  a readsnext instruction,
  a write instruction,
  a write shift instruction,
  a writesnext instruction,
  a writecol instruction, and
  a match instruction.

22. The associative processing memory system of claim 20 wherein said first logic unit selects a data pattern from the group of sources consisting of a data pattern in a data-in register, a data pattern in a host bus, all 1's and all 0's.

23. The associative processing memory system of claim 20 wherein said second logic unit selects a mask pattern from the group of sources consisting of a first pattern in a mask register, an internally generated second pattern, an internally generated third pattern and a logically ANDed product of an internally generated fourth pattern and said first pattern in said mask register.

24. The associative processing memory system of claim 17 wherein said input devices are selected from a group consisting of a match storage circuit, a prioritizer, a general purpose logic block (GPLB) and a reference value unit.

25. A method for operating an associative processing memory system said system comprising:
  a content addressable memory (CAM) array having a plurality of CAM words,
  a multiplexer which executes one of a plurality of input devices attached to said multiplexer and passes an output of one of said plurality of input devices, said multiplexer coupled to said CAM array;
  a processing logic unit coupled to said CAM array and coupled to a plurality of registers, and coupled to receive a first instruction, and
  an interface register logic block coupled to said CAM array, said interface register logic block comprising:
    a command register which stores said first instruction, and a control and status register which stores control and status information, said method comprising:

determining a particular operation comprising one of a match operation, a read operation and a write operation, said particular operation being specified in a value provided in a first field of said first instruction;

selecting one of said plurality of response registers, said selecting step being specified by a second field of said first instruction; and selecting one of said plurality of input devices to be selected to provide a select vector, said input devices comprising (i) an output of said processing logic unit, (ii) at least one of said plurality of registers, and (iii) a reference value unit, said step of selecting one of said plurality of input devices being specified by a third field of said first instruction.

26. A method as in claim 25 wherein said processing logic unit is coupled to a multiplexer and said multiplexer selects said plurality of input devices to provide said select vector.

27. A method as in claim 26 wherein said select vector specifies a subset of said plurality of CAM words, said subset comprising a second plurality of CAM words such that said particular operation is performed on said second plurality of CAM words.

28. A method as in claim 27 wherein said plurality of registers comprises a first register and a prioritizer and wherein said particular operation further comprises a read and clear operation such that a read operation is performed using a value stored in said prioritizer and a clear operation is performed to clear the most significant bit set in said first register.

29. A method as in claim 28 wherein said prioritizer comprises a multiple response resolver.

30. A method as in claim 28 wherein said particular operation further comprises an operation for writing the contents of said select vector to one of said plurality of registers.

31. A method as in claim 30 wherein said particular operation further comprises an operation for clearing the most significant bit set in said first register.

* * * * *